Figure 4:
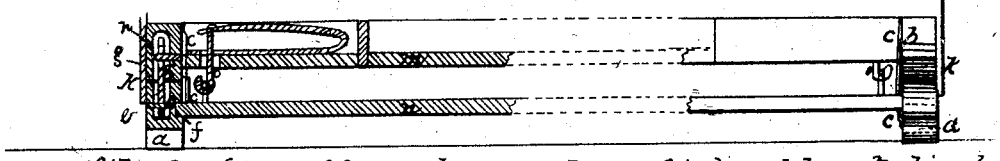
Figure 3:
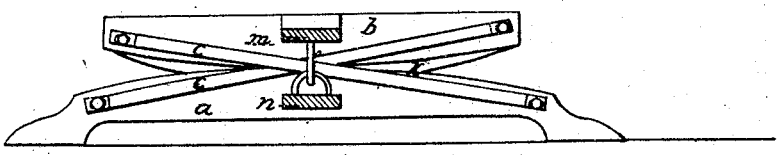
Figure 1:
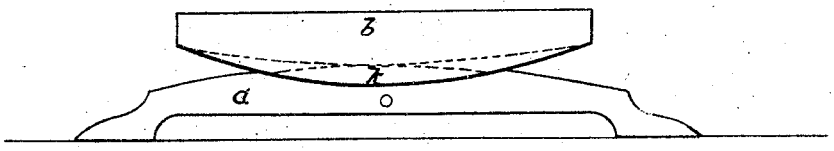
Figure 2:
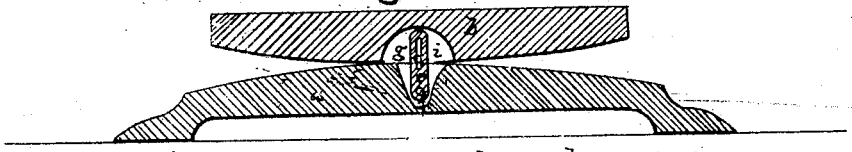

3150X

S. Simmons.

Cradle & Chair Rocker.

Patented Dec. 21. 1819.

Side elevation of two rockers - and a vertical and longitudinal Section of the opposite rockers.

Vertical Cross Section of the Stretchers exhibiting the rear or inner sides of the rockers.

End view of the rockers.

Vertical Section of the rockers.

MISSING PAGE TEMPORARY NOTICE

PATENT # 3150X FOR ISSUE DATE 12-21-1819

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text